(12) United States Patent
Brunina

(10) Patent No.: US 11,023,405 B2
(45) Date of Patent: Jun. 1, 2021

(54) DAISY CHAIN CONTROL NETWORK WITH DATA GENERATORS AND TOKEN-FORWARDING CONNECTIONS

(71) Applicant: ROCKLEY PHOTONICS LIMITED, London (GB)

(72) Inventor: Daniel Brunina, Pasadena, CA (US)

(73) Assignee: Rockley Photonics Limited, Oxford (GB)

(*) Notice: Subject to any disclaimer, the term of this patent is extended or adjusted under 35 U.S.C. 154(b) by 0 days.

(21) Appl. No.: 16/566,629

(22) Filed: Sep. 10, 2019

(65) Prior Publication Data
US 2020/0081862 A1 Mar. 12, 2020

Related U.S. Application Data

(60) Provisional application No. 62/729,816, filed on Sep. 11, 2018.

(51) Int. Cl.
*G06F 13/42* (2006.01)
*G06F 9/54* (2006.01)
*G06F 13/37* (2006.01)

(52) U.S. Cl.
CPC .......... *G06F 13/4256* (2013.01); *G06F 9/544* (2013.01); *G06F 13/37* (2013.01)

(58) Field of Classification Search
CPC ...... G06F 13/4256; G06F 9/544; G06F 13/37; G06F 13/364
See application file for complete search history.

(56) References Cited

U.S. PATENT DOCUMENTS

| | | | | |
|---|---|---|---|---|
| 7,051,135 B2* | 5/2006 | Zhu | ........................ | G06F 13/364 710/113 |
| 7,761,753 B2* | 7/2010 | Vogt | ..................... | G06F 13/4256 714/710 |
| 8,543,750 B1* | 9/2013 | Awad | ...................... | G06F 13/37 710/242 |
| 8,688,881 B2* | 4/2014 | Naylor | .................. | G06F 13/374 710/243 |

* cited by examiner

*Primary Examiner* — Tammara R Peyton
(74) *Attorney, Agent, or Firm* — Lewis Roca Rothgerber Christie LLP

(57) ABSTRACT

A system for sharing a data handling resource among a plurality of data producers. In some embodiments, the system includes: a data-handling resource, a first data generator, a first data connection, from the first data generator to the data-handling resource, a second data generator, a second data connection, from the second data generator to the first data generator, and a token-forwarding connection between the first data generator and the second data generator. The token-forwarding connection may be configured to transfer a token between the first data generator and the second data generator. The first data generator may be configured: to generate a first data stream, to receive a second data stream from the second data generator through the second data connection, and to send data selected from the first data stream and the second data stream.

13 Claims, 4 Drawing Sheets

(12) United States Patent
US 11,023,405 B2

DAISY CHAIN CONTROL NETWORK WITH DATA GENERATORS AND TOKEN-FORWARDING CONNECTIONS

CROSS-REFERENCE TO RELATED APPLICATION(S)

The present application claims priority to and the benefit of U.S. Provisional Application No. 62/729,816, filed Sep. 11, 2018, entitled "DAISY-CHAIN CONTROL NETWORK", the entire content of which is incorporated herein by reference.

FIELD

One or more aspects of embodiments according to the present disclosure relate to packet processing, and more particularly to a control network for sharing a data handling resource.

BACKGROUND

In various applications, a plurality of data-generating circuits, each of which generates data, may share a data handling resource. In such applications, it may be advantageous to implement a system for transmitting the data to the data handling resource in a manner that does not overload the resource, and that avoids collisions that might occur if all of the data-generating circuits were directly connected to the data handling resource.

SUMMARY

According to some embodiments of the present invention, there is provided a system for sharing a data-handling resource, among a plurality of data producers, the system including: a first data generator; a first data connection, from the first data generator to the data-handling resource, a second data generator; a second data connection, from the second data generator to the first data generator; and a token-forwarding connection between the first data generator and the second data generator, the token-forwarding connection being configured to transfer a token between the first data generator and the second data generator, the first data generator being configured: to generate a first data stream; to receive a second data stream from the second data generator through the second data connection; to send, to the data-handling resource, through the first data connection, data selected from the first data stream and the second data stream; and to prioritize, when selecting data from the first data stream and the second data stream: the first data stream when the first data generator is in possession of the token, and the second data stream when the first data generator is not in possession of the token.

In some embodiments, the system includes at least three data generators including: the first data generator, the second data generator, and a third data generator, wherein the token-forwarding connection is configured: to transfer the token directly from the first data generator to the second data generator, and to transfer the token from the second data generator to the first data generator, through one or more data generators, including the third data generator, of the at least three data generators.

In some embodiments, the first data generator is configured, when the first data generator is in possession of the token, to select data only from the first data stream.

In some embodiments, the first data generator is configured, when the first data generator is not in possession of the token, to select data only from the second data stream.

In some embodiments, the first data generator includes a first buffer for buffering data in the first data stream.

In some embodiments, the first data generator includes a second buffer at the second data connection.

In some embodiments, the first data generator is configured, when the first data generator is in possession of the token:
to select data from the first data stream when the first buffer is not empty, and to select data from the second data stream when the first buffer is empty.

In some embodiments, the first data generator is configured, when the first data generator is not in possession of the token:
to select data from the second data stream when the second buffer is not empty, and to select data from the first data stream when the second buffer is empty.

In some embodiments, the first data generator includes a token control circuit for: receiving a signal indicating that the first data generator has received the token, and transmitting a signal indicating that the first data generator has relinquished the token.

In some embodiments, the token control circuit includes a timer, and the token control circuit is configured to: start the timer when the token control circuit receives the signal indicating that the first data generator has received the token, and transmit the signal indicating that the first data generator has relinquished the token when the timer indicates that a set time interval has elapsed.

In some embodiments, the token control circuit includes a circuit for transmitting data across a clock domain boundary.

In some embodiments, the first data generator is an Ethernet port.

In some embodiments, the first data stream is a stream of ARP miss control packets, each ARP miss control packet being generated as a result of an ARP cache miss.

In some embodiments, each ARP miss control packet includes 64 bytes from an initial end of an Ethernet packet.

In some embodiments, the data-handling resource is a link to software for generating an ARP packet.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
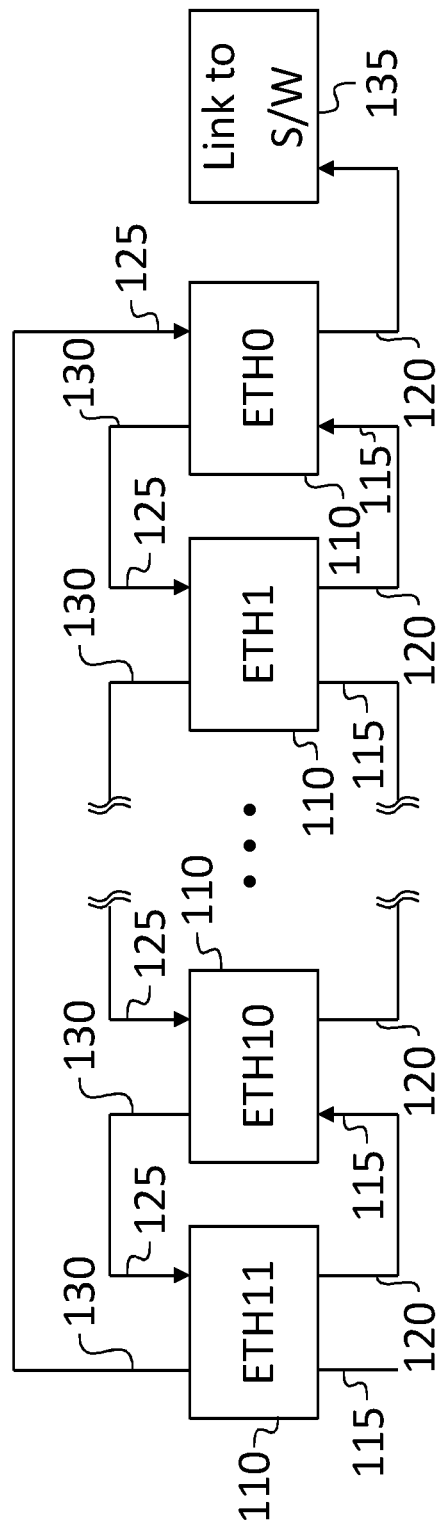
FIG. 1 is a block diagram of a daisy-chain control network, according to an embodiment of the present disclosure.

The detailed description set forth below in connection with the appended drawings is intended as a description of exemplary embodiments of a daisy-chain control network provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A packet-processing ASIC may contain an on-chip SRAM-based cache for address resolution protocol (ARP) lookups. This cache may store a list of Ethernet addresses along with a list of corresponding media access control (MAC) addresses. Each of one or more Ethernet ports in the packet-processing ASIC may receive Ethernet packets to be transmitted, by the Ethernet port, through external connections of the packet-processing ASIC. Each Ethernet port (or "ETH"), when it receives an Ethernet packet, may submit the destination Ethernet address of the Ethernet packet to the ARP cache, as part of a request for the corresponding MAC address. The ARP cache may return a result of either (i) success, or "ARP cache hit" (if the Ethernet address for which a MAC address is sought is in the cache, along with the corresponding MAC address) or (ii) failure, or "ARP cache miss" (otherwise). An ARP cache hit may allow the Ethernet port to transmit an Ethernet frame to a destination client external to the packet-processing ASIC. An ARP cache miss may cause the corresponding Ethernet port to drop its Ethernet frame and to instead transmit an ARP miss control packet to software (e.g., to a CPU running software for handling the ARP miss control packet), over a (relatively slow, e.g., 1 Gb/s) link, to ask for the data that was missing in the ARP cache. The software may then generate an ARP packet, which is broadcast by the packet-processing ASIC, and which may result in a reply including the MAC address sought; the MAC address may then be saved, along with the Ethernet address, in the ARP cache.

The packet-processing ASIC may contain a single ARP cache that is shared, for example, among twelve Ethernet ports. All twelve Ethernet ports may be independent from each other and may each access the ARP cache simultaneously. As a result, between zero and twelve independent ARP cache misses may occur on any given clock cycle of the packet-processing ASIC. If the packet-processing ASIC is a physically large terabit-scale switch ASIC, many of the Ethernet ports may be physically distant from the hardware responsible for the 1 Gb/s link to software used to handle ARP cache misses. Additionally, the 1 Gb/s link to software may be significantly slower than the combined data rate (e.g., 1.2 Tb/s) of all the Ethernet ports. As a result, if all twelve Ethernet ports were directly connected to the 1 Gb/s link then (i) some might have signal integrity issues from traveling a long distance across the packet-processing ASIC, (ii) the resulting wires from these connections could cause routing congestion; and (iii) repeated multiple simultaneous ARP misses might overwhelm the hardware of the 1 Gb/s link.

In some embodiments, these potential problems are addressed by implementing a token-based daisy chain to connect the twelve Ethernet ports with the 1 Gb/s link to software, as illustrated in FIG. 1. Each Ethernet port 110 has a daisy chain data input 115 (which may be unused for one of the Ethernet ports 110, e.g., for the left-most port in FIG. 1), a daisy chain data output 120, a token input 125, and token output 130. The Ethernet port 110 directly connected to (and which may be physically closest to) the 1 Gb/s link to software 135 may be referred to as "port 0" or "ETH0" and the Ethernet port 110 at the other end of the daisy chain, which may be more physically distant from the 1 Gb/s link to software 135, may be referred to as "port 11" or "ETH11". Port 11's daisy chain data input 115 is unused (or, in some embodiments, is absent), and port 11's daisy chain data output 120 is connected to the daisy chain data input 115 of port 10. Port 10's daisy chain data output 120 is connected to the daisy chain data input 115 of port 9 (not explicitly shown, and instead represented by an ellipsis, in FIG. 1), and so on; the daisy chain data output 120 of port 0 is connected to the input of the 1 Gb/s link to software. This configuration allows any Ethernet port 110 to transmit ARP miss control packets to the 1 Gb/s link to software 135, with each Ethernet port 110 except port 0 transmitting such ARP miss control packets to the 1 Gb/s link to software 135 through one or more other Ethernet ports 110. Each ARP miss control packet may be the first 64 bytes of the Ethernet packet that resulted in the ARP cache miss.

The fraction of use, by each of the Ethernet ports 110, of the 1 Gb/s link to software 135, e.g., the fairness of the daisy chain, may be controlled by a token which is passed between the Ethernet ports 110, so that only one Ethernet port 110 possesses the token at any time. The token is held by each Ethernet port 110 for a fixed amount of time before the Ethernet port 110 passes the token to the next Ethernet port 110 in line. The token transmission path may be a ring, as shown, in FIG. 1, within which the token is passed in one direction along the chain of Ethernet ports until it reaches the Ethernet port 110 at one end of the chain; from this Ethernet port 110 it is passed back to the Ethernet port 110 at the other end of the chain. In some embodiments, the token "counter-propagates", i.e., it is passed, as shown in FIG. 1, in a direction opposite to the direction of data flow along the chain. In other embodiments the token is passed in the same direction as the data, or among the Ethernet ports in an arbitrary order.

Each Ethernet port 110 generates a first data stream, consisting of ARP miss control packets (generating one such ARP miss control packet each time it experiences an ARP cache miss), and each Ethernet port 110 except the first in the chain (port 11) receives a second stream of data at its daisy chain data input 115. From these two data streams, the Ethernet port 110 forms the data stream that it transmits through its daisy chain data output 120. In forming this data stream, the Ethernet port 110 prioritizes the first data stream when the Ethernet port 110 possesses the token, and the Ethernet port 110 prioritizes the second data stream when the Ethernet port 110 does not possess the token.

For example, in some embodiments, the Ethernet port 110 only injects its own ARP miss control packets into the daisy chain when it possesses the token. When the Ethernet port 110 does not possess the token, it transmits only data from its daisy chain data input 115 to its daisy chain data output 120, dropping any ARP miss control packet that may result from an ARP cache miss it experiences when it does not possess the token. Any performance degradation resulting from such dropping of ARP miss control packets may be small, and acceptable, because a similar ARP miss may occur again, when the Ethernet port 110 is in possession of the token, and it may then be forwarded to the 1 Gb/s link to software 135.

For example, if port 5 receives the token from port 4 it starts a timer to determine when to pass the token to port 6. While the timer is running, if port 5 experiences an ARP miss, it transmits the ARP miss control packet to port 4 through its daisy chain data output 120. Port 4, which does not have the token, receives the ARP miss control packet from port 5 and passes it to port 3. In a similar fashion, each of port 3 port 2, and port 1 passes the ARP miss control packet on to the next port; port 0 then passes the ARP miss control packet to the 1 Gb/s link to software 135. If port 6 experiences an ARP cache miss while port 5 has the token, then port 6 may drop the corresponding ARP miss control packet.

Figure 2:
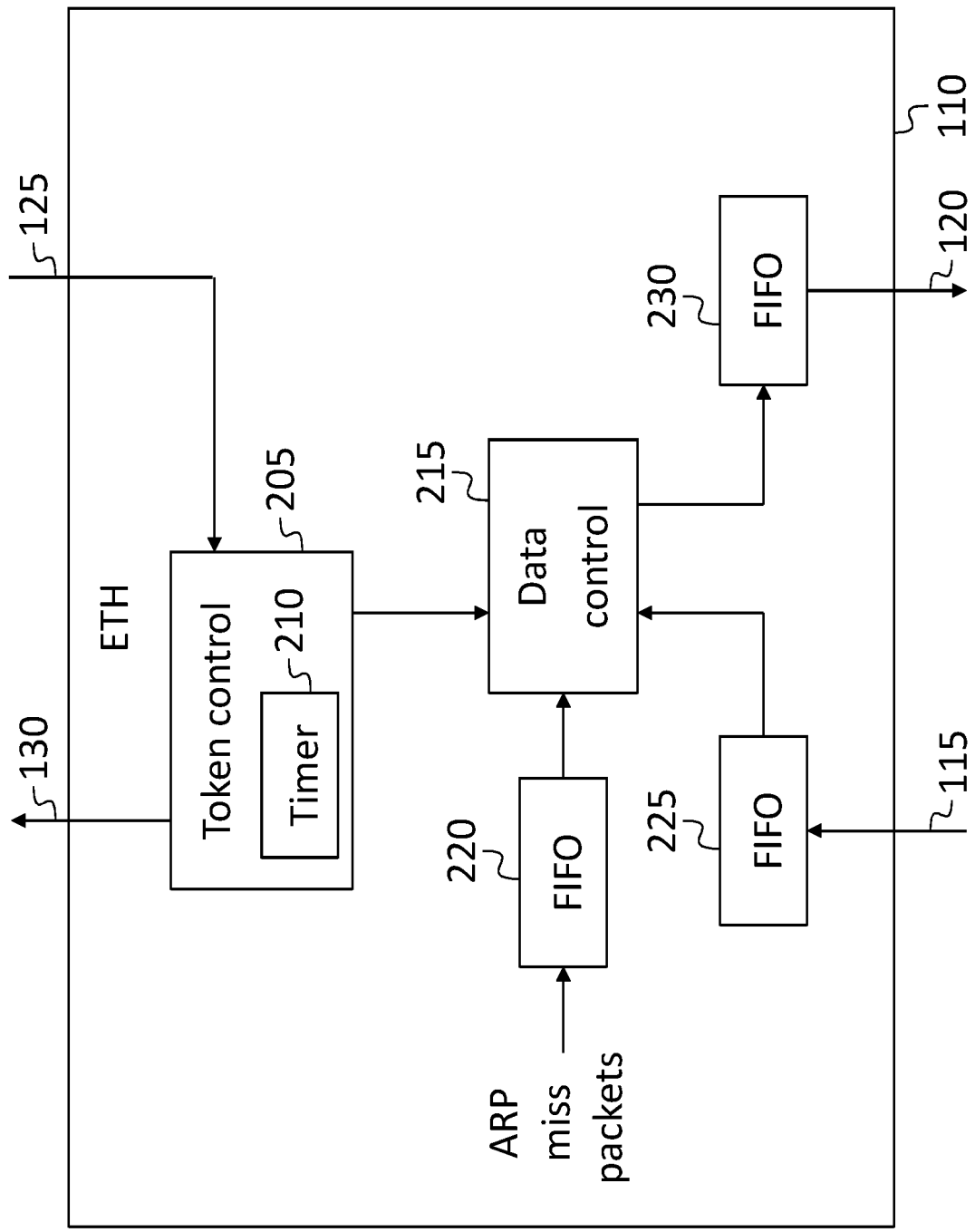
FIG. 2 is a block diagram of a data generator configured to operate as part of a daisy-chain control network, according to an embodiment of the present disclosure.

In other embodiments, each Ethernet port 110 may behave differently while nonetheless (i) prioritizing, when it possesses the token, any ARP miss control packets it itself generates, and (ii) prioritizing, when it does not possesses the token, ARP miss control packets it receives at its daisy chain data input 115. FIG. 2 shows a block diagram of the ARP cache miss handling elements of an Ethernet port 110, in some embodiments. A token control circuit 205 receives a signal from the upstream Ethernet port 110 (i.e., upstream in the token ring) when it receives the token, and sends a signal to the downstream Ethernet port 110 when it relinquishes the token. The token control circuit 205 may include a timer 210 (as mentioned above) that the token control circuit 205 may employ to ensure that it relinquishes the token at the appropriate time after having received it.

A data control circuit 215 may receive a first data stream, of ARP miss control packets generated within the Ethernet port 110, buffered by an internal buffer 220, and a second stream of data, buffered by an input buffer 225, of ARP miss control packets received at the daisy chain data input 115 of the Ethernet port 110. The data control circuit 215 may generate, from the first and second data streams, a third data stream, that is buffered by an output buffer 230 and transmitted through the daisy chain data output 120 of the Ethernet port 110. Each of the internal buffer 220, the input buffer 225, and the output buffer 230 may be a first-in first-out structure (FIFO) as shown.

At each clock cycle, the data control circuit 215 may take one of several actions, depending, in general, on the fullness of each of the internal buffer 220, the input buffer 225, and the output buffer 230, and on whether the Ethernet port 110 possesses the token, as communicated to the data control circuit 215 by the token control circuit 205. Each such action may involve one or more of (i) not reading an ARP miss control packet from the internal buffer 220, (ii) reading an ARP miss control packet from the internal buffer 220 and (1) discarding it, or (2) writing it to the output buffer 230, (iii) not reading an ARP miss control packet from the input buffer 225, and (iv) reading an ARP miss control packet from the input buffer 225 and (1) discarding it, or (2) writing it to the output buffer 230.

Figure 3A:
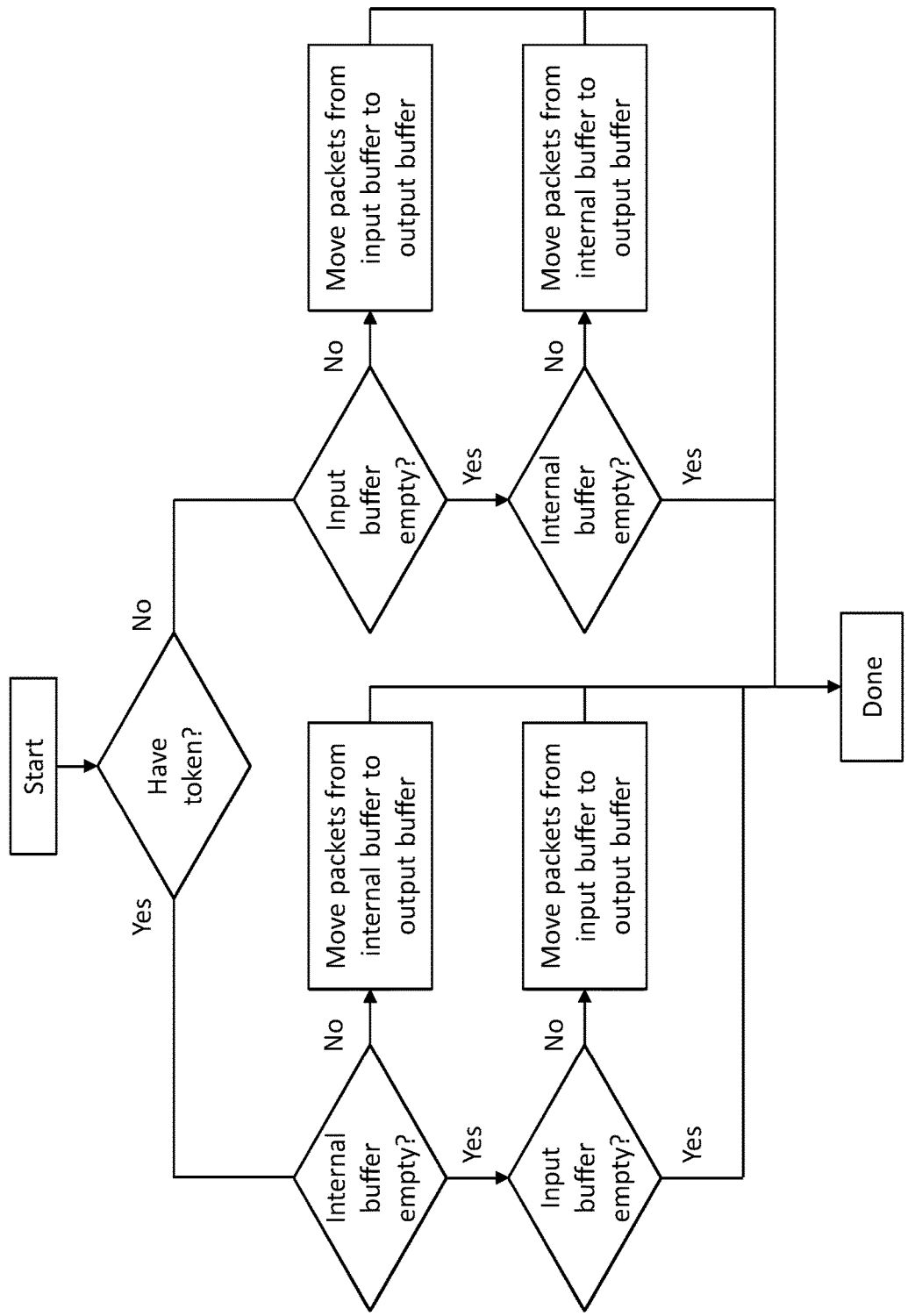
FIG. 3A is a flowchart of a method for processing ARP miss control packets, according to an embodiment of the present disclosure.
Figure 3B:
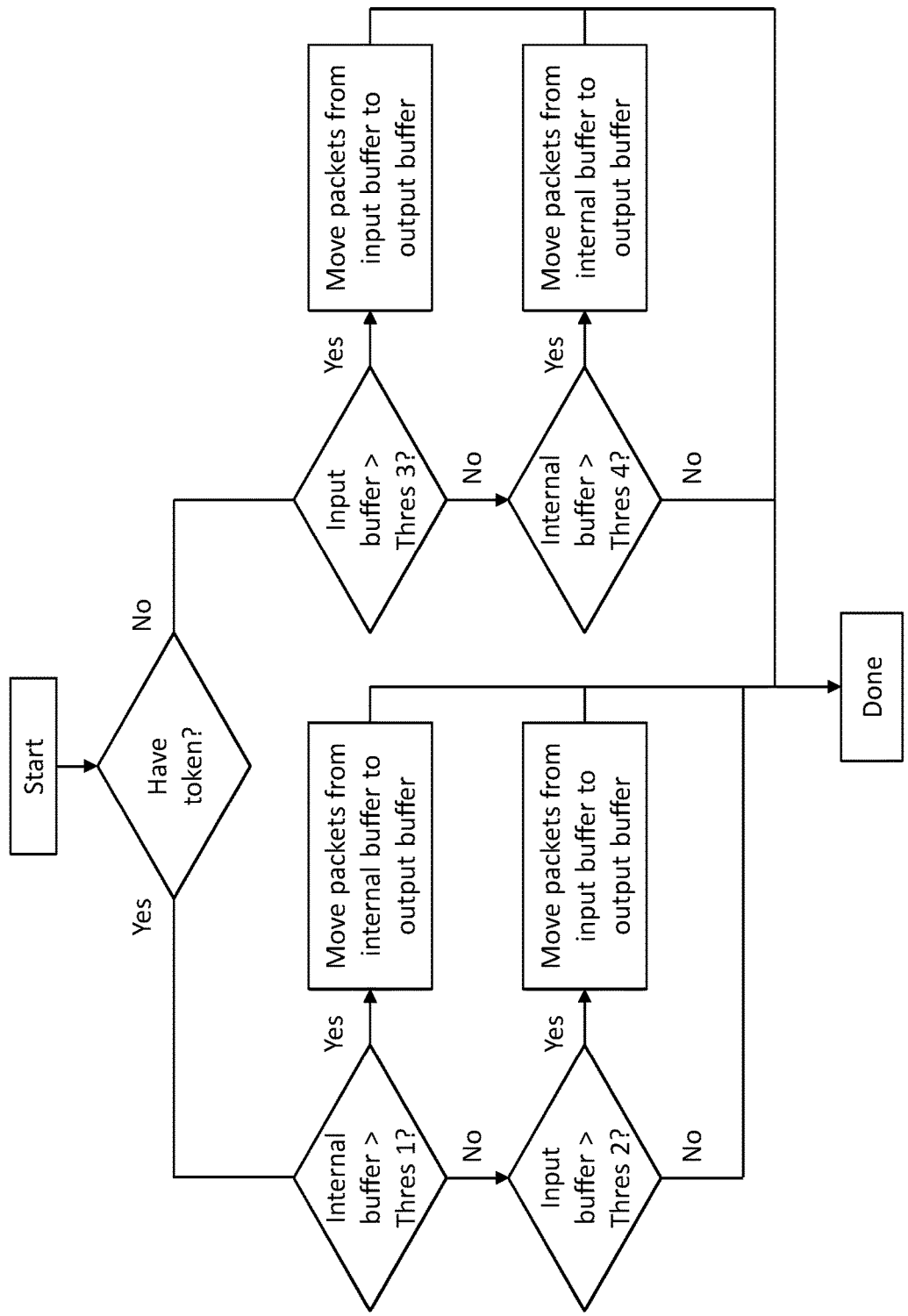
FIG. 3B is a flowchart of a method for processing ARP miss control packets, according to an embodiment of the present disclosure.

For example, when the Ethernet port 110 does not possess the token it may drop ARP miss control packets generated within the Ethernet port 110 (as mentioned above) by reading them from the internal buffer 220 and discarding them (or by not writing any newly generated ARP miss control packets into the internal buffer 220). In another embodiment, when the Ethernet port 110 does not possess the token it may nonetheless write ARP miss control packets generated within the Ethernet port 110 to the output buffer 230, if the fullness of the input buffer 225 is less than a threshold (e.g., if the input buffer 225 is empty, or if the input buffer 225 is less than half full). When the Ethernet port 110 possesses the token it may move ARP miss control packets from the input buffer 225 to the output buffer 230 when the internal buffer 220 is empty; when the internal buffer 220 is not empty, it may move ARP miss control packets from the internal buffer 220 to the output buffer 230, and (i) drop ARP miss control packets from the input buffer 225 when the input buffer 225 is full and (ii) allow ARP miss control packets to accumulate in the input buffer 225 when the input buffer 225 is not full. FIG. 3A is a flow chart for a method, in one embodiment, for moving ARP miss control packets from the internal buffer 220 or from the input buffer 225 into the output buffer 230, depending on whether the Ethernet port 110 possesses the token, whether the internal buffer 220 is empty, and whether the input buffer 225 is empty. FIG. 3B is a flow chart for a method, in one embodiment, for moving ARP miss control packets from the internal buffer 220 or from the input buffer 225 into the output buffer 230, depending on whether the Ethernet port 110 possesses the token, the fullness of the internal buffer 220, and the fullness of the input buffer 225. In FIG. 3B, "Thres 1", "Thres 2", "Thres 3", and "Thres 4" are first, second, third, and fourth fullness thresholds (so that, for example "Internal buffer<Thres 1" is true if the fullness of the internal buffer is less than the first fullness threshold). The four thresholds may in general all be different; in some embodiments they are not all different, and in some embodiments, they are all the same (e.g., all set to ¼ or ½). FIG. 3A corresponds to FIG. 3B with all four fullness thresholds set to zero.

In some embodiments, the token is a single-bit signal that is passed through a circuit for transmitting data across a clock domain boundary for ease of routing on the packet-processing ASIC. For example, the token output 130 of one Ethernet port 110 may be connected to the data input of a flip-flop in the next (downstream) Ethernet port 110. This flip-flip is the first flip-flop of a double-flop synchronizer (two flip-flops in a row, both on the same clock domain as the destination downstream Ethernet port 110). When the source Ethernet port 110 asserts the token signal to pass it along, that source Ethernet port 110 considers itself to no longer have the token. The receiving Ethernet port 110 may not "see" the token for at least two of its own clock cycles due to the synchronizer (plus any time-of-flight delays), and during this time no Ethernet port 110 has the token. This gap means that no two Ethernet ports 110 ever have the token at the same time despite no two Ethernet port 110 having to share the same clock domain.

Although some embodiments described herein involve Ethernet ports acting as data generators, generating ARP miss control packets, and sharing a 1 Gb/s link to software that acts as a data-handling resource, in other embodiments other data generators may be similarly configured, using a data daisy chain and a token ring, to share a data handling resource.

In some embodiments each of the methods or functions described herein is performed by a processing circuit or a portion of a processing circuit. For example, the systems and methods described herein may be implemented as respective, interacting circuits in one or more application-specific integrated circuits (ASICs), which may be, for example, one or more CMOS integrated circuits. As such, each data generator may be a respective data generating circuit, and the data-handling resource may be a data-handling resource circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Although exemplary embodiments of a daisy-chain control network have been specifically described and illustrated herein, many modifications and variations will be apparent to those skilled in the art. Accordingly, it is to be understood that a daisy-chain control network constructed according to principles of this disclosure may be embodied other than as specifically described herein. The invention is also defined in the following claims, and equivalents thereof.

What is claimed is:

1. A system for sharing a data-handling resource, among a plurality of data producers, the system comprising:
    a first data generator;
    a first data connection, from the first data generator to the data-handling resource;
    a second data generator;
    a second data connection, from the second data generator to the first data generator;
    a third data generator; and
    a token-forwarding connection between the first data generator and the second data generator,
    the token-forwarding connection being configured:
        to transfer a token between the first data generator and the second data generator;
        to transfer the token directly from the first data generator to the second data generator; and
        to transfer the token from the second data generator to the first data generator, through one or more data generators, including the third data generator, and
    the first data generator being configured:
        to generate a first data stream;
        to receive a second data stream from the second data generator through the second data connection;
        to send, to the data-handling resource, through the first data connection, data selected from the first data stream and the second data stream; and
        to prioritize, when selecting data from the first data stream and the second data stream:
            the first data stream when the first data generator is in possession of the token, and
            the second data stream when the first data generator is not in possession of the token.

2. The system of claim 1, wherein the first data generator is configured, when the first data generator is in possession of the token, to select data only from the first data stream.

3. The system of claim 2, wherein the first data generator is configured, when the first data generator is not in possession of the token, to select data only from the second data stream.

4. The system of claim 1, wherein the first data generator is an Ethernet port.

5. The system of claim 4, wherein the first data stream is a stream of ARP miss control packets, each ARP miss control packet being generated as a result of an ARP cache miss.

6. The system of claim 5, wherein each ARP miss control packet comprises 64 bytes from an initial end of an Ethernet packet.

7. The system of claim 5, wherein the data-handling resource is a link to software for generating an ARP packet.

8. A system for sharing a data-handling resource, among a plurality of data producers, the system comprising:
    a first data generator;
    a first data connection, from the first data generator to the data-handling resource;
    a second data generator;
    a second data connection, from the second data generator to the first data generator; and
    a token-forwarding connection between the first data generator and the second data generator,
    the token-forwarding connection being configured to transfer a token between the first data generator and the second data generator,
    the first data generator being configured:
        to generate a first data stream;
        to receive a second data stream from the second data generator through the second data connection;
        to send, to the data-handling resource, through the first data connection, data selected from the first data stream and the second data stream; and
        to prioritize, when selecting data from the first data stream and the second data stream:
            the first data stream when the first data generator is in possession of the token, and
            the second data stream when the first data generator is not in possession of the token,
    the first data generator comprising:
        a first buffer for buffering data in the first data stream; and
        a second buffer at the second data connection, and
    the first data generator being configured:
        when the first data generator is in possession of the token:
            to select data from the first data stream when the first buffer is not empty; and
            to select data from the second data stream when the first buffer is empty, or
        when the first data generator is not in possession of the token:
            to select data from the second data stream when the second buffer is not empty; and
            to select data from the first data stream when the second buffer is empty.

9. A system for sharing a data-handling resource, among a plurality of data producers, the system comprising:
    a first data generator;
    a first data connection, from the first data generator to the data-handling resource;
    a second data generator;
    a second data connection, from the second data generator to the first data generator; and
    a token-forwarding connection between the first data generator and the second data generator,
    the token-forwarding connection being configured to transfer a token between the first data generator and the second data generator,
    the first data generator being configured:
        to generate a first data stream;
        to receive a second data stream from the second data generator through the second data connection;
        to send, to the data-handling resource, through the first data connection, data selected from the first data stream and the second data stream; and
        to prioritize, when selecting data from the first data stream and the second data stream:
            the first data stream when the first data generator is in possession of the token, and the second data stream when the first data generator is not in possession of the token, and the first data generator comprising a token control circuit for:
- receiving a signal indicating that the first data generator has received the token, and
- transmitting a signal indicating that the first data generator has relinquished the token.

10. The system of claim 9, wherein the token control circuit comprises a timer, and the token control circuit is configured to:
- start the timer when the token control circuit receives the signal indicating that the first data generator has received the token, and
- transmit the signal indicating that the first data generator has relinquished the token when the timer indicates that a set time interval has elapsed.

11. The system of claim 10, wherein the token control circuit comprises a circuit for transmitting data across a clock domain boundary.

12. The system of claim 9, wherein the first data generator is configured, when the first data generator is in possession of the token, to select data only from the first data stream.

13. The system of claim 12, wherein the first data generator is configured, when the first data generator is not in possession of the token, to select data only from the second data stream.

* * * * *